JUSTIN P. SKINNER.
Improvement in Carriage Nuts.
No. 120,004. Patented Oct. 17, 1871.
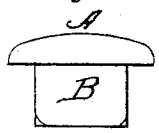
Fig. 1
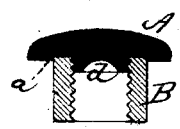
Fig. 2
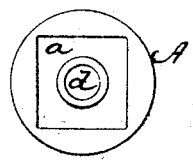
Fig. 3
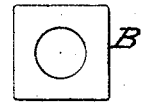
Fig. 4
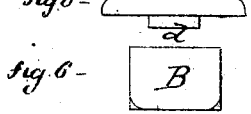
Fig. 5
Fig. 6
Justin P. Skinner
Inventor
By his Atty.
Witnesses

UNITED STATES PATENT OFFICE.

JUSTIN P. SKINNER, OF PLANTSVILLE, CONNECTICUT.

IMPROVEMENT IN CARRIAGE-NUTS.

Specification forming part of Letters Patent No. 120,004, dated October 17, 1871.

*To all whom it may concern:*

Be it known that I, JUSTIN P. SKINNER, of Plantsville, in the county of Hartford and State of Connecticut, have invented a new Improvement in Carriage-Nuts; and I do hereby declare the following, when taken in connection with the accompanying drawing and the letters of reference marked thereon, to be a full, clear, and exact description of the same, and which said drawing constitutes part of this specification, and represents in—

Figure 1 a side view of the nut complete; Fig. 2, a central section; Fig. 3, an under-side view of the cap detached; Fig. 4, the nut detached; Fig. 5, a side view of the cap; and in Fig. 6 a side view of the nut.

This invention relates to an improvement in the construction of that class of carriage hardware known as carriage-nuts, such as are commonly used for top-props or wherever it is desirable that the face of the nut should be covered, this class of nuts being adapted for other purposes than carriages.

Heretofore these nuts have been constructed by forming the cap from a disk of sheet metal and soldering the same to the nut, causing no inconsiderable labor, a large portion of which by my invention is avoided.

My invention consists in constructing the cap from malleable or other suitable metal with a projection upon its inner surface to set into the tapped perforation of the nut, and then, by a suitable instrument striking onto the said projection, the metal of the projection is struck or spread out into the thread of the nut, thus securing the two parts firmly together.

A is the cap, which I construct from malleable metal, with a recess upon its inner surface the size and shape of the nut to be attached, and with a projection, *d*, in the center of the recess, as seen in Fig. 5, the said projection corresponding to the diameter of the perforation for the nut. B is the nut, of common construction, tapped in the usual manner. This is set onto the cap, as seen in Fig. 2, and then by any suitable die or device the projection *d* is struck or pressed to cause it to spread and set into the thread of the nut, as clearly seen in Fig. 2, thus securely uniting the two parts together.

This is here represented for a square nut with a round cap or head; but I do not wish to be understood as confining myself to any configuration of the cap or nut.

I claim as my invention—

As a new article of manufacture, the herein-described nut, consisting of the nut B and cap A united and secured together by the projection *d* on the cap, substantially as set forth.

JUSTIN P. SKINNER.

Witnesses:
E. H. BACON,
SIMEON H. NORTON. (14)